Nov. 27, 1945.  F. HOTCHNER  2,389,911
LUMINOUS DISPLAY WITH EFFECT OF ANIMATION
Filed Feb. 6, 1942
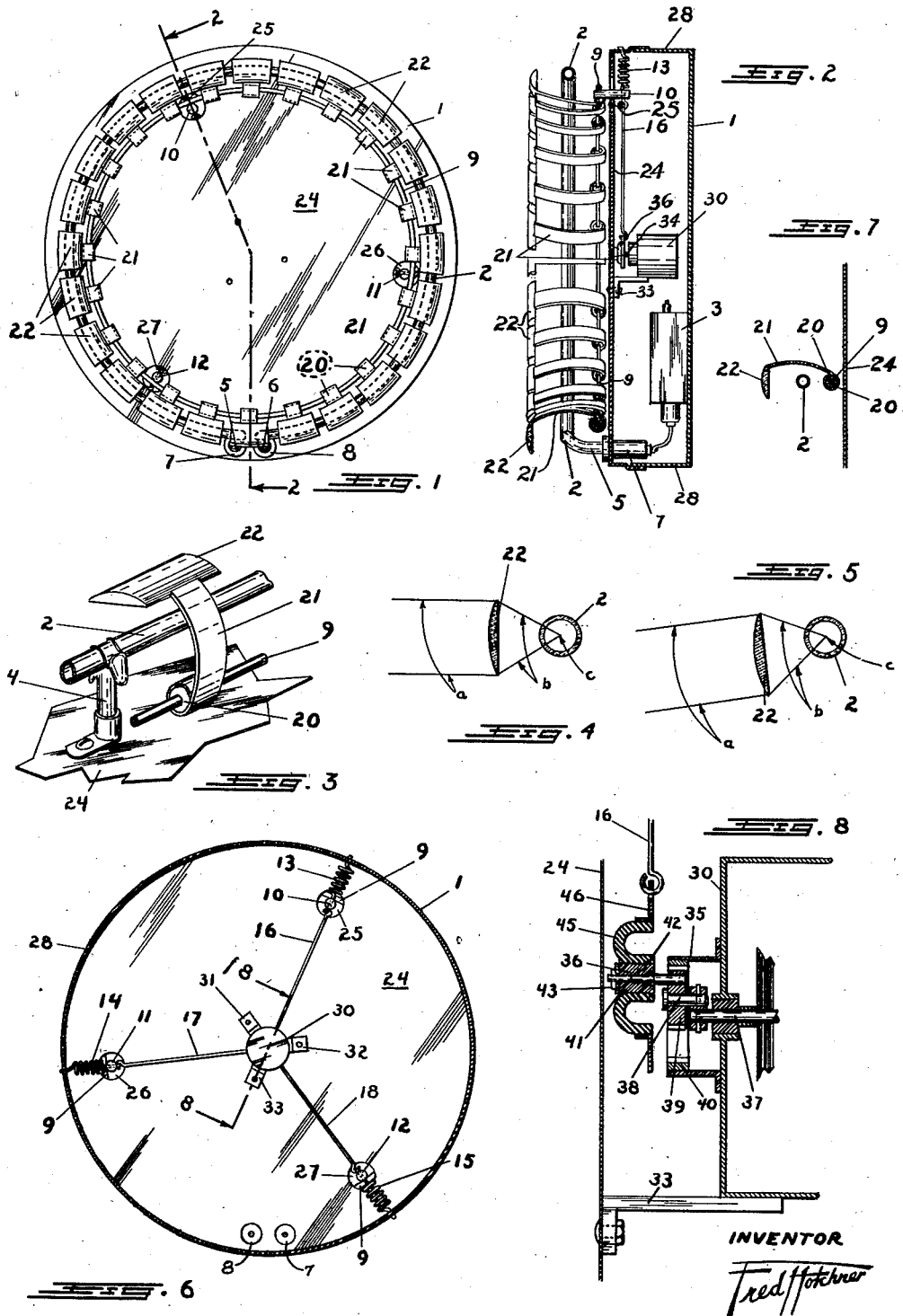
INVENTOR
Fred Hotchner Patented Nov. 27, 1945

2,389,911

UNITED STATES PATENT OFFICE 2,389,911

LUMINOUS DISPLAY WITH EFFECT OF ANIMATION

Fred Hotchner, Los Angeles, Calif.

Application February 6, 1942, Serial No. 429,760

8 Claims. (Cl. 40—139)

This invention relates to a luminous display having an effect of animation and is directed to the production of brilliant scintillating or sparkling effects along the outlines of decorative designs or the like as exemplified by decorative building outlining or electric attraction displays.

One object of the invention is to produce attraction effects as described by the condensation of light rays from a source into beams and sweeping the field of view with the resulting beams in a random manner so that an observer within range of the beams will see a sparkling effect over the display surface as the beams pass over his position in the random movement.

It is an object to produce this result by simple, low cost and highly reliable apparatus, and in this connection, to provide lens mountings for the purpose set forth which may be used fully exposed to the weather on outdoor displays without danger of ill effects from adverse weather conditions.

It is further an object to produce lens mountings which will be acceptable on a display surface from an esthetic consideration.

Another object is to provide an operating mechanism which will deliver random impulses to the lenses to keep them moving at random without taking up a general swing in phase.

The invention is particularly effective in connection with elongated illuminants such as gaseous conduction lighting tubes which are given the form of the design to be represented. In my Patent No. 2,272,202 of February 10, 1942, I disclosed the production of animation effects along such illuminants by the movement of lensed structures in front of the same. The instant invention is directed to certain improvements on the devices of the copending application in the following respect:

According to this invention an animated display effect may be produced over a very large sized surface by the transmission of mechanical vibrations to a lens carrying structure for considerable distances. Thus effects may be produced economically over displays of such size as to require, if built according to the prior art, prohibitively expensive mechanical construction if positive movements were to be delivered along the course of the illuminants.

It is an additional object to provide standardized optical elements which may be assembled in a simple manner to follow any desired outline thus avoiding the special machining or molding of lenses for each special application.

Another object is to provide a simple resilient mounting for individual lenses of the rubber spring type.

Various other objects of the invention will be apparent from the description which follows.

The invention is shown in its preferred embodiment in the accompanying drawing in which the same reference numeral indicates the same part in all of the views.

Figure 1 is a front elevation of an illuminated display having a gaseous conduction border tube which is to appear as though scintillating.

Figure 2 is a sectional view of the same taken along the section line 2—2 of Figure 1.

Figure 3 is a perspective view of a short section of the lighting tube showing one supporting post and one of the lenses.

Figures 4 and 5 are diagrammatic illustrations of the optical principle of the device.

Figure 6 is a rear view of the front plate of the device showing the driving mechanisms and linkages to the lens frame.

Figure 7 is a cross section of a modified arrangement of lens and tube showing a construction which produces a more ideal movement than the practical arrangement of Figure 2.

Figure 8 is a cross section through the impulse generating mechanism of the motor taken as indicated by the section line 8—8 in Figure 6.

In the drawing numeral 1 indicates the body proper of a display sign made hereaccording having a circular luminous tube 2 as a border which is to appear animated. Over the space within the border any desired display matter may be provided. Within the body is the transformer 3 for supplying high voltage current to the tube and the driving mechanism for the lenses. The tube is supported from the face plate 24 of the sign body at various places by insulating posts such as that indicated by numeral 4 in Figure 3. The terminal electrodes 5 and 6 of this tube make contact in the insulating housings 7 and 8 with suitable connections to the transformer.

The lens mounting ring 9 is supported in front of the face plate 24 by the rods 10, 11 and 12 which extend through the openings 25, 26 and 27 to the rear of the plate. Here they are supported by the coil springs 13, 14 and 15 which are attached to the rim 28 of the sign body, thus forming a resilient mounting for the lenses.

A series of lenses 22 are resiliently mounted from the ring 9 in front of the luminous tube and free to vibrate independently of each other crosswise of the tube. Various types of lenses and various different mountings may be used, the specific construction shown being selected to illustrate the principles involved and is not to be understood as limiting the scope of the invention.

The lenses shown are plano-convex, elongated in short sections lengthwise of the tube, and positioned in front of the tube at approximately the focal distance from the tube center. The projected beams are thus of narrow divergence transverse of the tube and a slight displacement of the lenses as they vibrate will throw the beams across the field of view for considerable sweeps. A person observing the display from any normal position of view will see bright regions along the tube at all those sections from which the beams reach his eye at any instant. If the lenses are caused to be in constant vibration at random, he will thus see a brilliant flickering effect along the border as the beam coverage of his position changes with the movements of the lenses.

One practical arrangement for resiliently mounting the lenses from the ring 9 is by means of a comparatively rigid bar 21 fastened rigidly to each of the lenses and terminating at the opposite end in a rounded portion encasing and vulcanized to a rubber cylinder 20. These cylinders are of soft rubber and are formed around the ring 9 and vulcanized to it. Each bar with its rubber is in effect a rubber spring with its major mode of vibration in torsion around the cylindrical axis. The weight of the bar and the attached lens acts against the resilience of the rubber to form an oscillating couple.

If the ring 9 is given a displacement in any direction it is obvious that the lenses will be vibrated more or less at random by virtue of the different angles the various planes of vibration make with the ring. The ordinary variations of dimensions and hardness of the rubber to be expected in commercial production will result in variations in the natural periods of the couples. As this is a desirable characteristics, low cost construction is to be taken advantage of.

If the ring is vibrated in various different directions the lenses will follow movements so completely at random as to produce a very pleasing scintillating effect. This construction may be used with lens arrangements following tubes of any desired outline, such as characters or the like, and satisfactory effects may be even had with straight tubes by the exercise of the skill in applying the vibratory impulses so that the lenses do not take up a general movement in unison.

The lenses may be of glass, synthetic resin or any other suitable transparent material and the bars may be fastened in any desired fashion to the lenses. As I have shown the connection, the bars are cemented to the lenses.

Theoretically the lenses should remain at a constant focal distance from the light source. In practice this is not necessary. In Figures 1 and 2 the ring 9 is displaced inward of the tube so that the lenses will change somewhat in tube spacing from the tube as they swing. In Figure 7 I have shown a modification in which the ring 9 is directly behind the tube so that the variation of tube spacing between the lens and the tube is much reduced. According to this variation special tube mountings differing from commercial standards are required, so that this scheme probably will not be much used in practice.

Figure 4 shows diagrammatically the beam a—a projected by the lens from the bundle of rays b—b collected from the center c of the glowing gas column of the tube when the lens is directly forward of the tube center. As the lens collects rays from all the other points of the gas column the projected beam is actually wider in divergence than diagram would suggest. However, the intensity of the light falls off rapidly for points more distant from the center c and a beam so projected is in effect of comparatively narrow divergence transverse of the tube if the tube is positioned near the focal point of the lens. The light being condensed in one direction the beam has much of the intensity of a searchlight beam and the effect is seen for great distances.

In Figure 5 the lens is shown in a position displaced from that of Figure 4 showing that the projected beam has taken a new direction.

One satisfactory driving mechanism is shown in Figures 2 and 6 and in enlarged cross section in Figure 8. The motor 30 is mounted to the back of the plate 24 by the legs 31, 32 and 33. Through the intervening spaces the tension rods 16, 17 and 18 extend to the vibrator mechanism 34. The opposite ends of these rods connect to the springs.

The vibrator mechanism includes the planetary gear drive 35 and the resilient coupling unit 36. The rotor shaft 37 of the motor drives the crank pin 38 on which the planet gear 39 turns freely. This gear meshes with the internal ring gear 40 and carries the pin 41 on which the hub 42 turns freely and is retained by the cotter pin 43. As the rotor shaft turns the pin 41 follows a curve similar to a hypocycloid along which it constantly changes in direction and speed. By changing the dimensions of the gear combination and the relative position of the pin a wide variety of movements may be generated.

The soft rubber ring 45 is vulcanized to the hub 42 and carries the drive ring 46 vulcanized to its rim. To this drive ring the tension rods are attached. The soft rubber ring 45 and the coil springs 13, 14 and 15 receive the impulses from the pin 41 and, acting against the weight of the associated parts, set up vibrations at different frequencies and in different directions from instant to instant in the supporting rod 9. The rubber cylinders 20 act with the weight of the associated bars 21 and lenses to form vibrating couples which are set in motion whenever the motion of the rod 9 is in agreement in frequency and direction with them.

This invention may be practiced in the animation of designs of any variety. As a matter of practical construction, supporting rods may be fabricated in straight lengths with the rubber springs, the arms and lenses complete and then bent up to follow the outline of any design to be animated. The unit thus formed is readily attached to the conventional type of neon tube sign without disturbing the tubes or electric connections.

The mechanic may be permitted wide latitude in arranging the supports and the driving element as the application of random impulses to any point of such a mounting will be sufficient to set the lenses vibrating particularly if the design follows different directions in its course. The device may be manufactured so that the natural period of vibration of the lenses varies from lens to lens to insure against several lenses vibrating in phase. This may be done by varying the hardness of the rubber, changing the dimensions of the rubber or varying the weight of the lens.

A convenient method of varying the resilience of the rubber springs to this end is to vary the time of vulcanization of the joints with the metal parts. Thus each rubber will be hardened to a different degree than its neighbors.

In the claims the following meanings shall apply to the terms: The term "design" shall mean any manner of inscription or ornament. The term "illuminant" shall embrace any primary light source or object rendered luminous by any means. The term "light interceptor" and its variants embraces objects which change the appearance of the corresponding portion of the illuminant to view in any manner. The terms of the claims are to be broadly construed as embracing all substantial equivalents thereof.

Having thus described my invention what I claim is:

1. An elongated illuminant in the outline of a design, a vibratile support coextensive with the same, a series of short light intercepting units resiliently mounted along and in front of said illuminant from said support, and means to vibrate said support to cause said light intercepting units to vibrate in front of said illuminant and produce an animation effect therealong.

2. An elongated illuminant extending in various directions in the representation of a design, a vibratile support coextensive with the same, a series of short light intercepting units resiliently mounted along and in front of said illuminant from said support, and means to impart random impulses to said support to vibrate said intercepting units at random in front of said illuminant.

3. An elongated illuminant in the outline of a design, a vibratile support coextensive therewith, a series of short lenses resiliently mounted from said support along and in front of said illuminant, said lenses being conformed and spaced to project beams of narrow divergence in that cross sectional dimension thereof transverse of said illuminant, and means to vibrate said support to vibrate said lenses across said illuminant.

4. An elongated illuminant extending in various different directions in representation of a design, a vibratile support coextensive therewith, a series of short lenses resiliently mounted from said support along and in front of said illuminant and restrained to general vibration individually transverse of said illuminant at their several positions, and means to impart vibratory impulses varying in direction from instant to instant to invoke selective response from said elements.

5. A vibratory element for a display comprising an arm having at one end a light intercepting element and at the other end a rubber spring to secure said arm to a support thereby forming a combination of mass and spring in which the mass is free to vibrate in one direction across said support.

6. In a display device a vibratile support, a plurality of arms individually attached to said support through rubber springs each restraining the attached arm to vibration in one direction, and a light intercepting mass at the end of each of said arms.

7. In a luminous display, a supporting body, a luminous tube in the outline of a design mounted therefrom, a vibratile support coextensive with said tube, a plurality of light interceptors resiliently mounted in front of said tube from said vibratile support and means to vibrate said vibratile support.

8. In a display device an elongated vibratile support, a series of rubber cylinders spaced therealong and tight thereto, an arm tight to the edge of each of said cylinders and carrying a mass, and means to vibrate said support.

FRED HOTCHNER.